US009905951B2

(12) United States Patent
Shinohara et al.

(10) Patent No.: US 9,905,951 B2
(45) Date of Patent: Feb. 27, 2018

(54) SILVER-PLATED PRODUCT

(71) Applicant: DOWA METALTECH CO., LTD., Tokyo (JP)

(72) Inventors: Keisuke Shinohara, Saitama (JP); Masafumi Ogata, Saitama (JP); Hiroshi Miyazawa, Saitama (JP)

(73) Assignee: Dowa Metaltech Co., Ltd., Tokyo (JP)

( * ) Notice: Subject to any disclaimer, the term of this patent is extended or adjusted under 35 U.S.C. 154(b) by 564 days.

(21) Appl. No.: 14/384,972

(22) PCT Filed: Mar. 1, 2013

(86) PCT No.: PCT/JP2013/056380

§ 371 (c)(1),
(2) Date: Sep. 12, 2014

(87) PCT Pub. No.: WO2013/137121

PCT Pub. Date: Sep. 19, 2013

(65) Prior Publication Data

US 2015/0037608 A1 Feb. 5, 2015

(30) Foreign Application Priority Data

Mar. 14, 2012 (JP) ................................ 2012-056595

(51) Int. Cl.

| | |
|---|---|
| ***B32B 15/01*** | (2006.01) |
| ***H01R 13/03*** | (2006.01) |
| ***C25D 3/46*** | (2006.01) |
| ***C25D 5/10*** | (2006.01) |
| ***C25D 5/34*** | (2006.01) |
| ***H01H 1/02*** | (2006.01) |

(52) U.S. Cl.
CPC ............... *H01R 13/03* (2013.01); *C25D 3/46* (2013.01); *C25D 5/10* (2013.01); *C25D 5/34* (2013.01); *H01H 1/02* (2013.01); *Y10T 428/12896* (2015.01); *Y10T 428/24355* (2015.01)

(58) Field of Classification Search
None
See application file for complete search history.

(56) References Cited

U.S. PATENT DOCUMENTS 8,273,465 B2 9/2012 Isumida et al.
2009/0229987 A1* 9/2009 Miyazawa ............. C25D 15/02 205/109

FOREIGN PATENT DOCUMENTS

JP 11060398 2/1999
JP 2002110136 A 4/2002
(Continued)

OTHER PUBLICATIONS

European Search Report for European Patent Application 13761843 dated Nov. 11, 2015.
(Continued)

*Primary Examiner* — Daniel J Schleis
(74) *Attorney, Agent, or Firm* — Bachman & LaPointe, PC

(57) ABSTRACT

There is provided a silver-plated product wherein a silver plating film having a thickness of not greater than 10 micrometers is formed on a base material of copper or a copper alloy and wherein the surface of the silver plating film has an arithmetic average roughness Ra of not greater than 0.1 micrometers, and the silver plating film has a {111} orientation ratio of not less than 35%.

6 Claims, 1 Drawing Sheet

(56) References Cited

FOREIGN PATENT DOCUMENTS

| | | | |
|---|---|---|---|
| JP | 3889718 | B2 | 12/2006 |
| JP | 2008169408 | A | 7/2008 |
| JP | 4279285 | B2 | 3/2009 |
| JP | 2010146925 | A | 7/2010 |
| JP | 2010222647 | A | 10/2010 |

OTHER PUBLICATIONS

M. Nowicki and P. Krupa, "The influence of substrate crystalline structure on DAES profiles of ultrathin silver layers on a Cu(001) face"., Jan. 1, 1997, pp. 313-316.

Wen P. Lin et al: "Microstructures of silver films plated on different substrates and annealed at different conditions", Electronic Components and Technology Conference (ECTC), 2011 IEEE 61st, IEEE May 31, 2011, pp. 1782-1786.

Khaled A. Soliman et al: "Electrocatalytic Behaviour of Epitaxial Ag(111) Overlayers Electrodeposited onto Noble Metals: Electrooxidation of d-Glucose", Electrocatalysis, vol. 3, No. 3-4, Aug. 8, 2012, pp. 170-175.

* cited by examiner

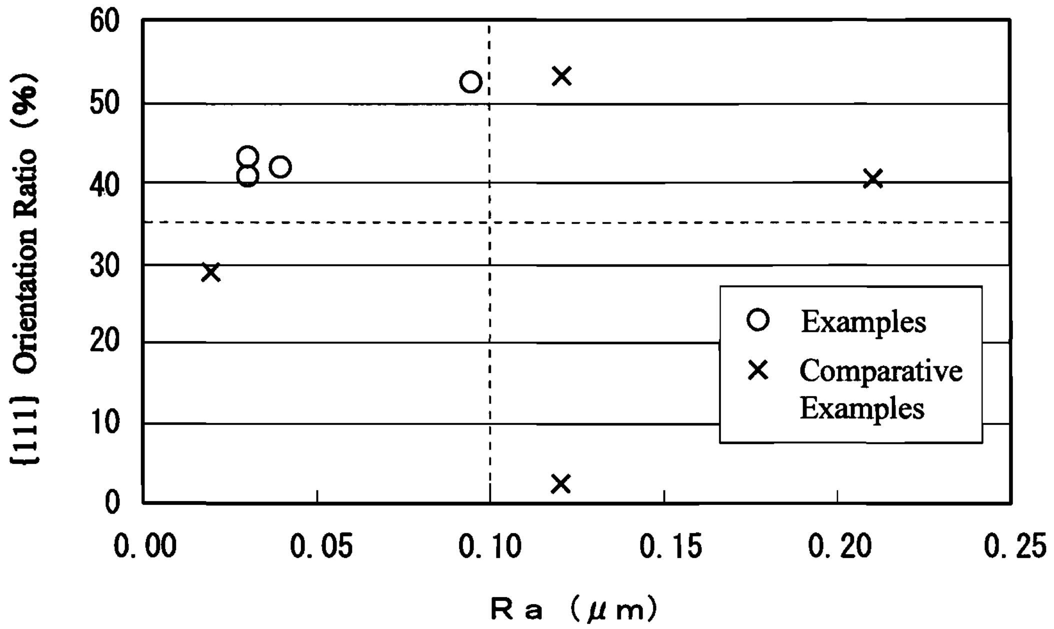
60
50
40
30
20
10
0
0.00
0.05
0.10
0.15
0.20
0.25
Ra (μm)
{111} Orientation Ratio (%)
Examples
Comparative Examples

SILVER-PLATED PRODUCT

TECHNICAL FIELD

The present invention generally relates to a silver-plated product. More specifically, the invention relates to a silver-plated product used as the material of contact and terminal parts, such as connectors, switches and relays, which are used for automotive and/or household electric wiring.

BACKGROUND ART

As conventional materials of contact and terminal parts, such as connectors and switches, there are used plated products wherein a base material of stainless steel, copper, a copper alloy or the like, which is relatively inexpensive and which has excellent corrosion resistance, mechanical characteristics and so forth, is plated with tin, silver, gold or the like in accordance with required characteristics, such as electrical and soldering characteristics.

Tin-plated products obtained by plating a base material of stainless steel, copper, a copper alloy or the like, with tin are inexpensive, but they do not have good corrosion resistance. Gold-plated products obtained by plating such a base material with gold have excellent corrosion resistance and high responsibility, but the costs thereof are high. On the other hand, silver-plated products obtained by plating such a base material with silver are inexpensive in comparison with gold-plated products and have excellent corrosion resistance in comparison with tin-plated products.

As such a silver-plated product, there is proposed a metal plate for electrical contacts, wherein a silver plating film having a thickness of 1 micrometer is formed on a copper plating film having a thickness of 0.1 to 0.5 micrometers which is formed on a nickel plating film having a thickness of 0.1 to 0.3 micrometers which is formed on the surface of a thin base material plate of stainless steel (see, e.g., Japanese Patent No. 3889718). There is also proposed a silver-coated stainless bar for movable contacts, wherein a surface layer of silver or a silver alloy having a thickness of 0.5 to 2.0 micrometers is formed on an intermediate layer of at least one of nickel, a nickel alloy, copper and a copper alloy having a thickness of 0.05 to 0.2 micrometers, the intermediate layer being formed on an activated underlying layer of nickel which has a thickness of 0.01 to 0.1 micrometers and which is formed on a base material of stainless steel (see, e.g., Japanese Patent No. 4279285). Moreover, there is proposed a silver-coated material for movable contact parts, wherein a surface layer of silver or a silver alloy having a thickness of 0.2 to 1.5 micrometers is formed on an intermediate layer of copper or a copper alloy having a thickness of 0.01 to 0.2 micrometers, the intermediate layer being formed on an underlying layer of any one of nickel, a nickel alloy, cobalt or a cobalt alloy which has a thickness of 0.005 to 0.1 micrometers and which is formed on a metallic substrate of copper, a copper alloy, iron or an iron alloy, the arithmetic average roughness Ra of the metallic substrate being 0.001 to 0.2 micrometers, and the arithmetic average roughness Ra after forming the intermediate layer being 0.001 to 0.1 micrometers (see, e.g., Japanese patent Laid-Open No. 2010-146925).

However, if such a conventional silver-plated product is used as the material of automotive sliding switches and so forth, there is some possibility that the silver plating film thereof may be worn due to repeated sliding movements to expose the base material thereof to increase the electrical resistance thereof, so that the wear resistance thereof against the sliding movements is not sufficient.

DISCLOSURE OF THE INVENTION

It is therefore an object of the present invention to eliminate the above-described conventional problems and to provide a silver-plated product having excellent wear resistance.

In order to accomplish the aforementioned object, the inventors have diligently studied and found that it is possible to produce a silver-plated product having excellent wear resistance if a silver plating film, the surface of which has an arithmetic average roughness Ra of not greater than 0.1 micrometers and which has a {111} orientation ratio of not less than 35%, is formed on a base material. Thus, the inventors have made the present invention.

According to the present invention, a silver-plated product comprises: a base material; and a silver plating film formed on the base material, wherein a surface of the silver plating film has an arithmetic average roughness Ra of not greater than 0.1 micrometers, and the silver plating film has a {111} orientation ratio of not less than 35%. In this silver-plated product, the base material is preferably made of copper or a copper alloy. The silver plating film preferably has a thickness of not greater than 10 micrometers.

Throughout the specification, the "{111} orientation ratio" means the percentage (%) of an X-ray diffraction intensity (an integrated intensity at an X-ray diffraction peak) on {111} plane of the silver plating film with respect to the sum of values (corrected intensities) obtained by correcting X-ray diffraction intensities on {111}, {200}, {220} and {311} planes (which are main orientation modes in a silver crystal) of the silver plating film using relative intensity ratios (relative intensity ratios in the measurement of powder) described on JCPD card No. 40783.

According to the present invention, it is possible to provide a silver-plated product having excellent wear resistance which is suitably used as the material of automotive sliding switches and so forth.

BRIEF DESCRIPTION OF THE DRAWINGS

FIG. 1 is a graph showing the relationship between the arithmetic average roughness Ra of the surface of the silver plating film of the silver-plated product in each of Examples and Comparative Examples and the {111} orientation ratio of the silver plating film thereof.

BEST MODE FOR CARRYING OUT THE INVENTION

In the preferred embodiment of a silver-plated product according to the present invention, a silver plating film (of pure silver) having a thickness of not greater than 10 micrometers is formed on a base material of copper or a copper alloy. The arithmetic average roughness Ra of the surface of the silver plating film is not greater than 0.1 micrometers, and is preferably 0.03 to 0.09 micrometers. The {111} orientation ratio of the silver plating film is not less than 35%, and is preferably 40 to 60%. Even if a silver rivet is caused to slide on the silver-plated product at a load of 100 gf 300,000 times, the abrasion loss of the silver plating film (the thickness of the worn silver plating film) is less than 1 micrometer. That is, even if the thickness of the silver plating film is about 1 micrometer, after a silver rivet is caused to slide on the silver-plated product at a load of 100 gf 300,000 times, the base material of the silver-plated product is not exposed. Thus, the silver-plated product has extremely excellent wear resistance.

Examples of a silver-plated product according to the present invention will be described below in detail.

EXAMPLE 1

First, a pure copper plate having a size of 67 mm×50 mm×0.3 mm was prepared as a material to be plated. The material to be plated and a SUS plate were put in an alkali degreasing solution to be used as a cathode and an anode, respectively, to carry out electrolytic degreasing at 5 V for 30 seconds. The material thus electrolytic-degreased was washed, and then, pickled for 15 seconds in a 3% sulfuric acid. The pretreatment of the material to be plated was thus carried out.

Then, the pretreated material to be plated and a titanium electrode plate coated with platinum were used as a cathode and an anode, respectively, to electroplate the material at a current density of 2.5 $A/dm^2$ for 10 seconds in a silver strike plating solution comprising 3 g/L of silver potassium cyanide and 90 g/L of potassium cyanide while stirring the solution at 400 rpm by a stirrer. The silver strike plating was thus carried out.

Then, the silver-strike-plated material to be plated and a silver electrode plate were used as a cathode and an anode, respectively, to electroplate the material at a current density of 5.0 $A/dm^2$ and a liquid temperature of 25° C. in a silver plating solution comprising 111 g/L of silver potassium cyanide ($KAg(CN)_2$), 120 g/L of potassium cyanide and 18 mg/L of potassium selenocyanate (KSeCN) while stirring the solution at 400 rpm by a stirrer, until a silver plating film having a thickness of 3 micrometers was formed. The silver plating was thus carried out.

With respect to a silver-plated product thus produced, the arithmetic average roughness Ra (which is a parameter indicating the surface roughness) of the silver plating film thereof and the {111} orientation ratio thereof were calculated, and the wear resistance thereof was evaluated.

The arithmetic average roughness Ra of the surface of the silver plating film was calculated on the basis of JIS B0601 from the results of measurement at an objective magnification of 100 and a measuring pitch of 0.01 micrometers using a super-depth surface profile measuring microscope (or color laser microscope) (VK-8500 commercially available from Keyence Corporation). As a result, the arithmetic average roughness Ra of the surface of the silver plating film was 0.03 micrometers.

The {111} orientation ratio of the silver plating film was calculated as the percentage (%) of an X-ray diffraction intensity (an integrated intensity at an X-ray diffraction peak) on {111} plane of the silver plating film with respect to the sum of values (corrected intensities) obtained by correcting X-ray diffraction intensities on {111}, {200}, {220} and {311} planes (which were main orientation modes in a silver crystal) of the silver plating film using relative intensity ratios (relative intensity ratios in the measurement of powder) described on JCPD card No. 40783, after the X-ray diffraction intensities on the {111}, {200}, {220} and {311} planes were obtained from an X-ray diffraction pattern which was obtained by carrying out the 2θ/θ scan using an X-ray tube of Cu and the $K_\beta$ filter method by means of a full-automatic multi-purpose horizontal X-ray diffractometer (SmartLab produced by RIGAKU Corporation). As a result, the {111} orientation ratio of the silver plating film was 41%. Furthermore, in the calculation of the {111} orientation ratio, the peak at a higher angle than that on the {311} plane was ignored to be approximated. In addition, since the X-ray diffraction intensity was varied in accordance with the orientation plane, the existing ratio of each of the orientation planes was not simply an X-ray diffraction intensity ratio on each of the orientation planes, so that the above-described relative intensity ratios were used for correcting the {111} orientation ratio.

The wear resistance of the silver plating film was evaluated as follows. First, about 30 mg per an area of 8 $cm^2$ of a grease (MULTEMP D No. 2 produced by Kyodo Yushi Co., Ltd.) was applied on the surface of the silver-plated product (wherein the silver plating film having a thickness of 3 micrometers was formed on the copper plate having a thickness of 0.3 mm) to be uniformly extended. On the surface thereof, a silver rivet (containing 89.7 wt % of Ag and 0.3 wt % of Mg and having a curvature radius of 8 mm) was caused to slide 300,000 times at a load of 100 gf and a sliding speed of 12 mm/sec by a sliding distance of 5 mm while applying a current of 500 mA thereto (assuming the actual use). After such a sliding test was carried out, the abrasion loss of the silver plating film (the thickness of the worn silver plating film) was measured for evaluating the wear resistance. As a result, the abrasion loss of the silver plating film was 0.4 micrometers.

EXAMPLE 2

A silver-plated product was produced by the same method as that in Example 1, except that a silver plating solution comprising 185 g/L of silver potassium cyanide, 60 g/L of potassium cyanide and 18 mg/L of potassium selenocyanate was used for carrying out the silver plating at a liquid temperature of 18° C.

With respect to a silver-plated product thus produced, the arithmetic average roughness Ra of the surface of the silver plating film thereof and the {111} orientation ratio thereof were calculated by the same method as that in Example 1, and the wear resistance thereof was evaluated by the same method as that in Example 1. As a result, the arithmetic average roughness Ra of the surface of the silver plating film was 0.03 micrometers, and the {111} orientation ratio was 43%. The abrasion loss of the silver plating film was 0.4 micrometers.

EXAMPLE 3

A silver-plated product was produced by the same method as that in Example 1, except that a silver plating solution comprising 185 g/L of silver potassium cyanide, 120 g/L of potassium cyanide and 18 mg/L of potassium selenocyanate was used for carrying out the silver plating.

With respect to a silver-plated product thus produced, the arithmetic average roughness Ra of the surface of the silver plating film thereof and the {111} orientation ratio thereof were calculated by the same method as that in Example 1, and the wear resistance thereof was evaluated by the same method as that in Example 1. As a result, the arithmetic average roughness Ra of the surface of the silver plating film was 0.04 micrometers, and the {111} orientation ratio was 42%. The abrasion loss of the silver plating film was 0.4 micrometers.

EXAMPLE 4

A silver-plated product was produced by the same method as that in Example 1, except that a silver plating solution comprising 166 g/L of silver potassium cyanide, 100 g/L of potassium cyanide and 91 mg/L of potassium selenocyanate was used for carrying out the silver plating at a liquid temperature of 18° C.

With respect to a silver-plated product thus produced, the arithmetic average roughness Ra of the surface of the silver plating film thereof and the {111} orientation ratio thereof were calculated by the same method as that in Example 1, and the wear resistance thereof was evaluated by the same method as that in Example 1. As a result, the arithmetic average roughness Ra of the surface of the silver plating film was 0.09 micrometers, and the {111} orientation ratio was 53%. The abrasion loss of the silver plating film was 0.7 micrometers.

COMPARATIVE EXAMPLE 1

A silver-plated product was produced by the same method as that in Example 1, except that a silver plating solution comprising 150 g/L of silver potassium cyanide and 90 g/L of potassium cyanide was used for carrying out the silver plating at a current density of 1.2 A/dm$^2$ and a liquid temperature of 47° C.

With respect to a silver-plated product thus produced, the arithmetic average roughness Ra of the surface of the silver plating film thereof and the {111} orientation ratio thereof were calculated by the same method as that in Example 1, and the wear resistance thereof was evaluated by the same method as that in Example 1. As a result, the arithmetic average roughness Ra of the surface of the silver plating film was 0.12 micrometers, and the {111} orientation ratio was 53%. The abrasion loss of the silver plating film was 2.0 micrometers.

COMPARATIVE EXAMPLE 2

A silver-plated product was produced by the same method as that in Example 1, except that a silver plating solution comprising 185 g/L of silver potassium cyanide, 120 g/L of potassium cyanide and 73 mg/L of potassium selenocyanate was used for carrying out the silver plating at a liquid temperature of 18° C.

With respect to a silver-plated product thus produced, the arithmetic average roughness Ra of the surface of the silver plating film thereof and the {111} orientation ratio thereof were calculated by the same method as that in Example 1, and the wear resistance thereof was evaluated by the same method as that in Example 1. As a result, the arithmetic average roughness Ra of the surface of the silver plating film was 0.02 micrometers, and the {111} orientation ratio was 29%. The abrasion loss of the silver plating film was 1.3 micrometers.

COMPARATIVE EXAMPLE 3

A silver-plated product was produced by the same method as that in Example 1, except that a silver plating solution comprising 111 g/L of silver potassium cyanide, 120 g/L of potassium cyanide and 18 mg/L of potassium selenocyanate was used for carrying out the silver plating at a current density of 2.0 A/dm$^2$.

With respect to a silver-plated product thus produced, the arithmetic average roughness Ra of the surface of the silver plating film thereof and the {111} orientation ratio thereof were calculated by the same method as that in Example 1, and the wear resistance thereof was evaluated by the same method as that in Example 1. As a result, the arithmetic average roughness Ra of the surface of the silver plating film was 0.12 micrometers, and the {111} orientation ratio was 2%. The abrasion loss of the silver plating film was 1.8 micrometers.

COMPARATIVE EXAMPLE 4

With respect to a commercially-available silver-plated product for use in automotive sliding switches, the arithmetic average roughness Ra of the surface of the silver plating film thereof and the {111} orientation ratio thereof were calculated, and the wear resistance thereof was evaluated. As a result, the arithmetic average roughness Ra of the surface of the silver plating film was 0.21 micrometers, and the {111} orientation ratio was 40%. The abrasion loss of the silver plating film was 2.7 micrometers.

The producing conditions and evaluated results of the silver-plated product in each of Examples and Comparative Examples are shown in Tables 1 and 2. FIG. 1 shows the relationship between the arithmetic average roughness Ra of the surface of the silver plating film and the {111} orientation ratio of the silver plating film of the silver-plated product in each of Examples and Comparative Examples.

TABLE 1

| | $K[Ag(CN)_2]$ (g/L) | KCN (g/L) | KSeCN (mg/L) | Liquid Temp. (° C.) | Current Density (A/dm$^2$) |
|---|---|---|---|---|---|
| Ex. 1 | 111 | 120 | 18 | 25 | 5.0 |
| Ex. 2 | 185 | 60 | 18 | 18 | 5.0 |
| Ex. 3 | 185 | 120 | 18 | 25 | 5.0 |
| Ex. 4 | 166 | 100 | 91 | 18 | 5.0 |
| Comp. 1 | 150 | 90 | 0 | 47 | 1.2 |
| Comp. 2 | 185 | 120 | 73 | 18 | 5.0 |
| Comp. 3 | 111 | 120 | 18 | 25 | 2.0 |

TABLE 2

| | Ra (μm) | {111} Orientation Ratio (%) | Abrasion Loss of Ag (μm) |
|---|---|---|---|
| Ex. 1 | 0.03 | 41 | 0.4 |
| Ex. 2 | 0.03 | 43 | 0.4 |
| Ex. 3 | 0.04 | 42 | 0.4 |
| Ex. 4 | 0.09 | 53 | 0.7 |
| Comp. 1 | 0.12 | 53 | 2.0 |
| Comp. 2 | 0.02 | 29 | 1.3 |
| Comp. 3 | 0.12 | 2 | 1.8 |
| Comp. 4 | 0.21 | 40 | 2.7 |

As can be seen from Table 2 and FIG. 1, in the silver-plated product in each of Examples 1 through 4 wherein the arithmetic average roughness Ra of the surface of the silver plating film is not greater than 0.1 micrometers and the {111} orientation ratio of the silver plating film is not less than 35%, the abrasion loss of the silver plating film is less than 1 micrometer after the sliding test for causing the silver rivet to slide on the silver-plated product at the load of 100 gf 300,000 times. That is, the base material of the silver-plated product is not exposed after the sliding test for causing the silver rivet to slide on the silver-plated product at the load of 100 gf 300,000 times even if the thickness of the silver plating film is about 1 micrometer. Thus, the silver-plated product in each of Examples 1 through 4 has extremely excellent wear resistance.

The invention claimed is:

1. A silver-plated product comprising:

a base material; and a silver plating film formed on the base material, wherein a surface of the silver plating film has an arithmetic average roughness Ra of not greater than 0.1 micrometers, and the silver plating film has a {111} orientation ratio of not less than 35%.

2. A silver-plated product as set forth in claim 1, wherein said base material is made of copper or a copper alloy.

3. A silver-plated product as set forth in claim 1, wherein said silver plating film has a thickness of not greater than 10 micrometers.

4. A silver-plated product as set forth in claim 2, wherein said silver plating film has a thickness of not greater than 10 micrometers.

5. A silver-plated product as set forth in claim 1, wherein said {111} orientation ratio is 30 to 60%.

6. A silver-plated product as set forth in claim 1, wherein said {111} orientation ratio is 40 to 60%.

* * * * *